(No Model.)
E. J. EMERSON.
TRACK SCRAPER.
No. 498,249. Patented May 30, 1893.
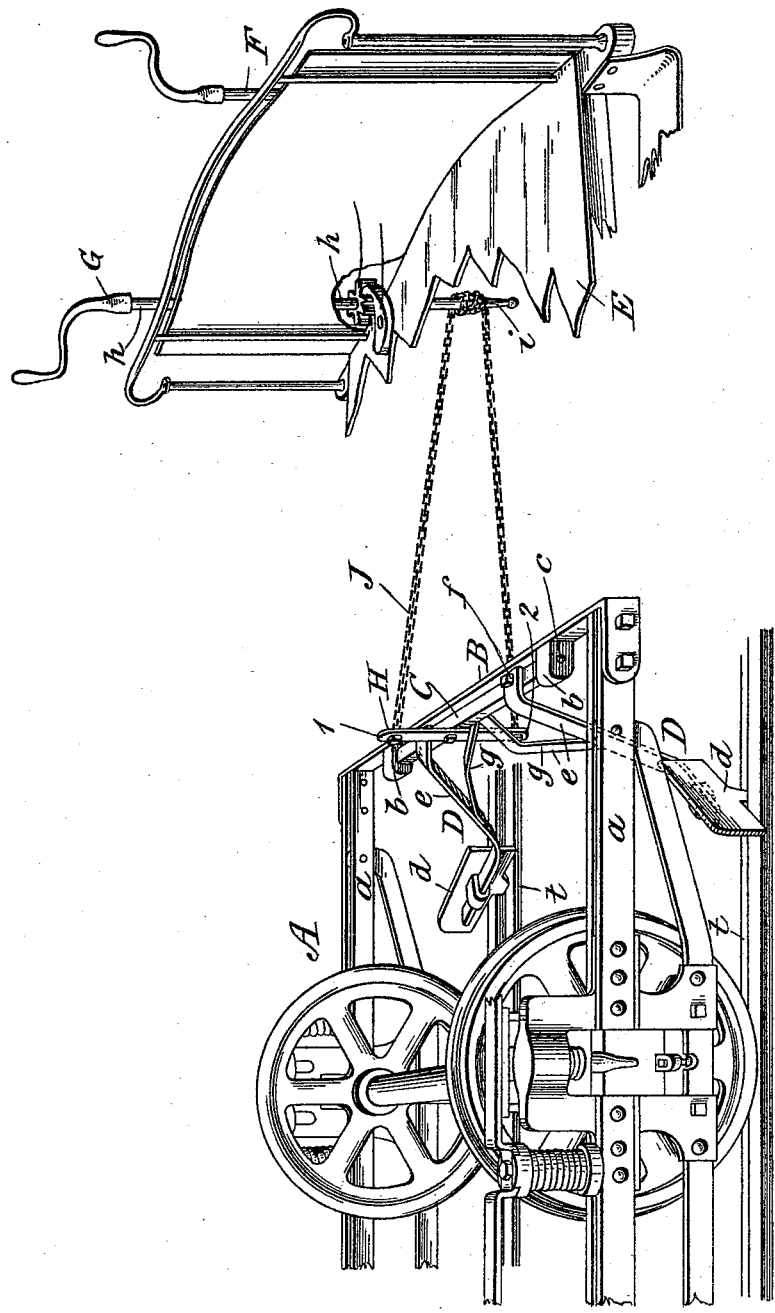
WITNESSES:
INVENTOR

UNITED STATES PATENT OFFICE.

EDWIN J. EMERSON, OF JERSEY CITY, NEW JERSEY.

TRACK-SCRAPER.

SPECIFICATION forming part of Letters Patent No. 498,249, dated May 30, 1893.

Application filed October 31, 1892. Serial No. 450,453. (No model.)

*To all whom it may concern:*

Be it known that I, EDWIN J. EMERSON, a citizen of the United States, and a resident of Jersey City, in the county of Hudson and State of New Jersey, have invented certain new and useful Improvements in Track-Scrapers, of which the following is a specification.

This invention relates to track scrapers of street railway cars including such cars as are operated by electrical means; and the invention has for its object the devising of a track scraper to be connected directly to the frame of the truck which frame in electric motor cars is adapted to support the motor.

Heretofore track scrapers of street railway cars have been generally connected to the car-body, and by reason of the oscillation of the car have not operated satisfactorily, for the reason that the scraper partaking of the oscillatory motion of the car could not be effectually maintained on the track when depressed for the purpose of cleaning the track.

My invention contemplates the applying of the track scraper directly to the truck-frame and operating the same by a peculiarly organized mechanism from the platform of the car.

The accompanying drawing which is a view in perspective showing one end of an electric car truck and a fragmentary view of the platform of a car, illustrates one embodiment of the invention and the best form that at present occurs to me.

Referring to the drawing, A indicates one end of a street car truck-frame of a type adapted for supporting an electric motor. $a$ indicates the side bars of the truck-frame which in this instance are joined to the saddles which are supported upon the axle-boxes, and B is a transverse bar connecting the ends of the side bars. The inner surface of the bar B is provided with lugs $b$ which are perforated transversely for the purpose of furnishing bearings for the journals $c$ of a bar C which is formed of suitable metal preferably square in cross section. The bar C has connected to it the scrapers which are indicated by D and comprise, preferably, besides the scrapers proper indicated by $d$, and which may be of any approved form and are adapted to co-operate with the car track $t$, the arms $e$ fashioned in the requisite form so that they may support the scrapers $d$ at their lower ends in such manner as that the scrapers may be held in proper relation to the track when lowered to co-operate therewith, and connected by means of bolts $f$ or otherwise to the top surface of the bar C. The supplemental arms $g$ extend from near the bottom of arms $e$ at which point they are bolted, or otherwise fastened, to the longitudinal center of the bar C at which point they are suitably fastened to the under surface of said bar. The arms $e$ and $g$ are preferably of steel and of the requisite flexibility to permit the scrapers when lowered for co-operating with the track to spring over any obstructions with which they may come in contact.

The means that I have adopted for giving the necessary motion to the bar C which is journaled in the lugs $b$ as explained, and by the use of which the scrapers are elevated or lowered from the platform of the car, is as follows:—To the car platform E at the side not occupied by the brake crank, which latter I have indicated by the letter F, I support in any suitable manner the operating means comprising the crank handle G and a vertical bar $h$ which bar $h$ extends below the floor of the platform as indicated at $i$. To one side of the longitudinal center of the brake supporting bar C and to its inner surface there is secured a cross bar H. The said bar H occupies a position at right angles to the length of the brake supporting bar C as shown in the drawing and its connection to said bar C is a rigid one. To the ends of the cross bar H there are connected the ends of a chain J which extends from the truck frame to beneath the platform of the car where it is wound upon the protruding end of the vertical bar $h$ as shown. The extreme end of $i$ is enlarged to prevent the chain from slipping from its position. The chain J is of such length that when the scrapers are in one of their extreme positions, depressed or elevated, there is a certain length of the chain wound upon the protruding end $i$ of the vertical bar $h$ which wound up portion of the chain is unwound when reversing the movement of the crank handle G, and a corresponding length of the chain from above or below, as the case may be, is wound upon said end $i$. In the drawing the scrapers are shown in their lowered position on the track in which position the cross bar H occupies a vertical position with reference to the transverse bar B of the truck frame. To elevate the scrapers from the track the crank handle G is turned to the right the effect of which is to wind up that portion of the chain connected to the end 1 of the said cross bar H and to play out or unwind that portion of the chain connected to the end 2 of said cross bar H, which operation tilts the cross bar H from its vertical position with the effect of turning the scraper supporting bar C on its journals which movement will raise the scrapers from the track.

In lieu of the chain J any other suitable connecting means between the scraper supporting bar and the crank on the platform of the car may be employed. It is also obvious that means other than a crank and chain operated on the platform of the car may be used for giving the requisite motion to the scraper supporting bar journaled to the truck frame, and I do not therefore limit myself to the particular operating mechanism illustrated.

It is of course to be understood that both ends of the truck-frame are to be equipped with a track scraper and both platforms of the car provided with crank mechanism for operating the appliances connected to the scraper.

Having thus described my invention, what I claim as new, and desire to secure by Letters Patent, is—

1. The combination with a car-truck frame provided with a transverse end-beam and a track scraper pivotally mounted upon said end-beam, of a crank mechanism mounted on the car-platform and a flexible connection between the track scraper and said crank mechanism, substantially as set forth.

2. The combination with a car-truck frame having a transverse end-beam provided with pivoting lugs, of a track scraper suitably affixed to a supporting bar which is journaled in the lugs on said end-beam, and appliances for operating the scraper-supporting bar from the car-platform, substantially as set forth.

3. The combination with a car-truck frame provided with a transverse end-beam having lugs, as $b$, on its inner surface and a track scraper suitably supported on a bar, as C, having its ends journaled in the lugs on said transverse end-beam, of a cross bar, as H, fixed to said scraper-supporting bar between one of its ends and its longitudinal center, a crank mechanism mounted on the car platform and a suitable connection between the ends of said cross-bar H and the crank mechanism on the car-platform, substantially as set forth.

4. The combination with a track scraper pivotally mounted on the car-truck frame, a bar fixed transversely to the pivoted supporting-bar of the scraper, and a crank mechanism mounted on the car-platform and including a vertical rod, as $h$, whose lower end extends below said platform, of a chain having one of its ends connected to one end of said transversely fixed bar and its other end connected to the opposite end of said bar and sufficiently long to permit a portion of its length to be wound upon the lower end of the rod $h$, substantially as and for the purpose set forth.

Signed at New York, in the county of New York and State of New York, this 24th day of October, A. D. 1892.

EDWIN J. EMERSON.

Witnesses:
J. E. M. BOWEN,
J. J. KENNEDY.